(12) United States Patent
O'Donnell

(10) Patent No.: US 7,149,294 B2
(45) Date of Patent: Dec. 12, 2006

(54) ALTERNATIVE MEANS FOR PUBLIC TELEPHONE INFORMATION SERVICES

(76) Inventor: Christopher O'Donnell, 11 Shuttle Ct., Gaithersburg, MD (US) 20878

( * ) Notice: Subject to any disclaimer, the term of this patent is extended or adjusted under 35 U.S.C. 154(b) by 196 days.

(21) Appl. No.: 10/449,675

(22) Filed: Jun. 2, 2003

(65) Prior Publication Data

US 2004/0240646 A1    Dec. 2, 2004

(51) Int. Cl.
*H04M 15/00*    (2006.01)
*H04M 3/42*    (2006.01)

(52) U.S. Cl. .............................. 379/114.2; 379/114.23; 379/218.01; 379/114.13

(58) Field of Classification Search ........... 379/114.15, 379/114.2, 114.23, 114.24, 114.25, 114.26, 379/144.01, 218.01, 222, 223, 114.1, 114.12, 379/114.13, 114.21; 455/406, 414.1, 414.2, 455/414.3
See application file for complete search history.

(56) References Cited

U.S. PATENT DOCUMENTS

| | | | |
|---|---|---|---|
| 4,850,007 A * | 7/1989 | Marino et al. ......... | 379/114.13 |
| 4,979,206 A | 12/1990 | Padden et al. | |
| 5,333,186 A | 7/1994 | Gupta et al. | |
| 5,448,625 A | 9/1995 | Lederman | |
| 5,652,784 A | 7/1997 | Blen et al. | |
| 5,864,604 A * | 1/1999 | Moen et al. ............. | 379/114.2 |
| 5,970,124 A * | 10/1999 | Csaszar et al. .......... | 379/88.18 |
| 6,212,262 B1 * | 4/2001 | Kamel ..................... | 379/88.22 |
| 6,246,755 B1 * | 6/2001 | Walker et al. ........... | 379/114.2 |
| 6,301,342 B1 | 10/2001 | Ander et al. | |
| 6,466,910 B1 | 10/2002 | Desmond et al. | |

* cited by examiner

*Primary Examiner*—Quoc Tran
(74) *Attorney, Agent, or Firm*—Michael L. Greenberg, Esq; Greenberg & Lieberman, LLC

(57) ABSTRACT

A method is described to provide an alternative telephone information service implemented by a service provider other than the telecommunication service used in the connection of the call. This independent information service provides the caller information services at a minimal or at no cost to the caller. The cost of the call to the caller is subsidized or entirely paid by promotion message sponsors in exchange for the caller listening, with possible interaction by the caller and rewards to the caller, to at least one sponsored promotional message prior to connection to the requested information. This service information includes telephone listings, weather, date/time, local/national news, traffic conditions, airplane schedules, text to voice translated caller e-mail, account member mailbox messages or other information of interest to the local or national caller.

12 Claims, 5 Drawing Sheets

ALTERNATIVE MEANS FOR PUBLIC TELEPHONE INFORMATION SERVICES

CROSS REFERENCE TO RELATED APPLICATIONS

Not applicable to this application.

STATEMENT REGARDING FEDERALLY SPONSORED RESEARCH OR DEVELOPMENT

Not applicable to this application.

BACKGROUND OF THE INVENTION

1. Field of the Invention

The present invention relates generally to telecommunications and more specifically it relates to an alternative method to acquire directory assistance and other information services provided by an independent information service provider.

2. Description of the Prior Art

It can be appreciated that local telephone providers, for example AT&T, Verizon, Bell South and Sprint, have been offering telephone toll services for years. Typically, these services are offered to the subscriber through assigned dial-up numbers such as "411" or "555-1212" to gain traffic, weather and date/time reports and directory assistance. These nationally recognized numbers are handled by the regional telephone carrier that returns billing for their use on the monthly bill of the telephone subscriber. These toll service features, available through many telephone compliant systems, are especially convenient to the wireless cellular user typically needing information while traveling, anxious to avoid a traffic jam or looking for a business or restaurant.

FIG. 1 is a simplified block diagram of one version of the telephone system 100 with a toll service feature platform. The feature platform is operated by the telephone service provider to provide various information services for their subscribers. As is well known, a telephone subscriber originates a call 101 by dialing the desired number which is detected at local switching office 103. The switching office provides call routing of the call across the network 104 to the call destination 105. For a cellular telephone connection 102, the switch office would be a cell site and mobile switching center (MSC) to link the wireless call to the landline network. If the subscriber dialed an information toll service, the switch office would recognize the assigned number, such as "411", and route the call to the appropriate feature platform which, in this example, includes directory assistance 108. An information database 107 stores the information data to be accessed by an Interactive Voice Response (IVR) 106 system and/or live operator 108. In an effort to save costs, a caller may be first delivered to a basic "if this, push 3" type IVR system and, with any confusion in the IVR system or by caller request, a live operator will come on line to resolve the call. Even simple menu driven IVR type systems have proven to reduce feature costs through reduced call center loading. With conclusion of the feature toll service, the feature platform generates a file in billing 109 to bill the telephone subscriber.

Unfortunately, these prior art methods to provide toll services by the telephone providers for their subscribers continue to be costly to the subscriber. The telephone subscriber has no alternative to the carrier's available service and fees. For example, an AT&T cellular subscriber may dial "411" and will receive an AT&T managed directory assistance call center. The following bill will typically itemize each call but will also indicate a fee for each call to directory assistance regardless of the call plan. Directory assistance is very popular, even considered necessary by the typical mobile cellular telephone user but even moderate usage can result in a large bill. Landline telephone users also rely on directory assistance for new, out of the area listings or other numbers not covered by the regional telephone directory books. Many subscribers require fast, voice driven information access. Searching the Internet or the improbable help of a telephone directory book (unavailable, outdated, wrong coverage, no coverage etc.) is not a viable option to travelers and commuters or subscribers without access to a computer.

Also, existing telephone carrier operated service features may be accessed by anyone using the subscriber telephone with the activated features. Therefore, a subscriber may have little control over unauthorized use of those services (i.e. a large business) and will receive a costly telephone bill.

An alternative telephone information service is needed to correct the problems of the prior art methods. This alternative resource would provide efficient two-way voice interactive telephone access, create account access passwords selected by the caller in the form of voice recognition or a voice print and operate such that the caller is charged a minimal or no fee to enjoy the service.

In these respects, the present inventive solution substantially departs from the conventional concepts, methods and apparatus designs of the prior art, and in so doing provides a method for the purpose of providing an alternative telephone information service.

SUMMARY OF THE INVENTION

In view of the foregoing disadvantages inherent in the known types of standard telephone information services now present in the prior art, the present invention provides a method for an alternative telephone information service (ATIS) implemented by a service provider other than any telephone carrier that connects the call. This independent information service provides the caller a different approach for fast and easy access to information services at a minimal or no cost. The service is accessed by dialing any typical voice telephone through an identified toll free "800" type number where the caller registers an account with a first number and dials a second toll free number to access the service. The cost of the call to the caller is subsidized or entirely paid by the advertising sponsor in exchange with the caller listening, with possible interaction, to at least one sponsored promotional message prior to connection to the desired information service. This service information includes directory assistance, weather reports, date/time, local/national news, traffic conditions, airplane schedules, text to voice translated caller e-mail, account member mailbox messages or other information of interest to the local or national caller. Rewards may be offered with caller interaction during the promotional messages. The number, duration and frequency of promotional messages are determined by ATIS and identified to the caller with the information service request. It is preferred that the promotional messages will be based on national rather than regionally recognized products and services.

There has thus been outlined, rather broadly, the more important features of the invention in order that the detailed description thereof may be better understood, and in order that the present contribution to the art may be better appreciated. There are additional features of the invention that will be described hereinafter.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

A primary object of the present invention is to provide a method that will overcome the shortcomings of the prior art devices.

An object is to provide a telephone information service that provides information desired by the caller independent of the feature services offered by the network telephone providers.

Another object is to provide a telephone information service at minimal or at no monetary cost to the caller.

A further object is to provide a telephone information service that provides account password protection through voice recognition or a voice print of the caller.

Other objects and advantages of the present invention will become obvious to the reader and it is intended that these objects and advantages are within the scope of the present invention. To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

DESCRIPTION OF THE PREFERRED EMBODIMENT

Figure 1:
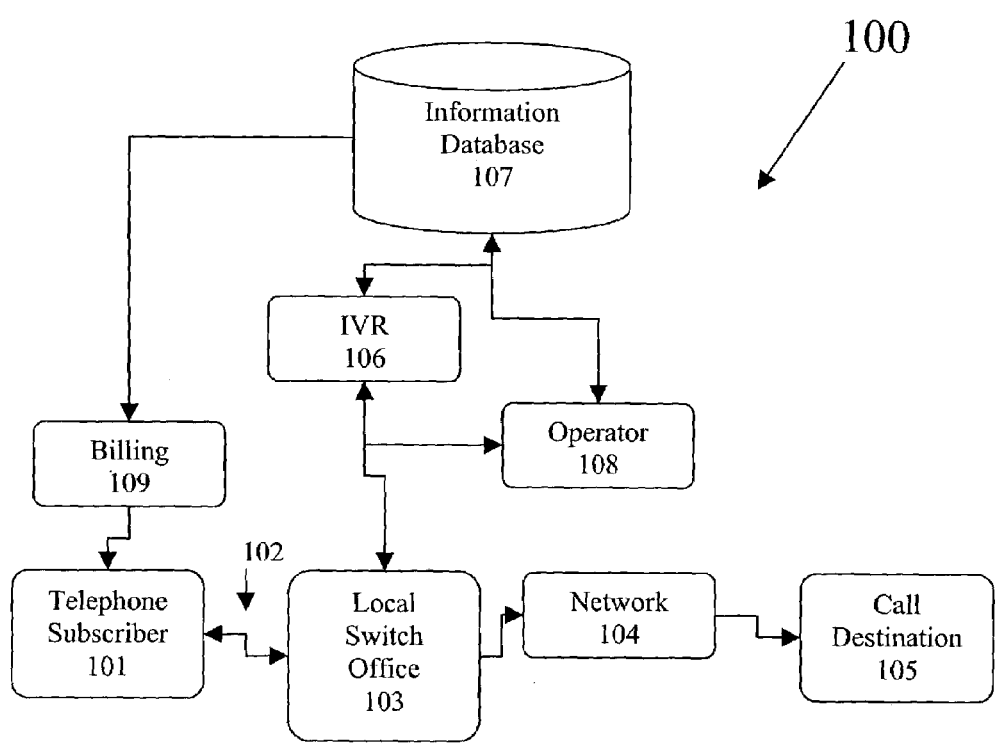
FIG. 1 is a block diagram of the prior art directory assistance service feature offered by the network telephone service providers for their subscribers.
Figure 2:
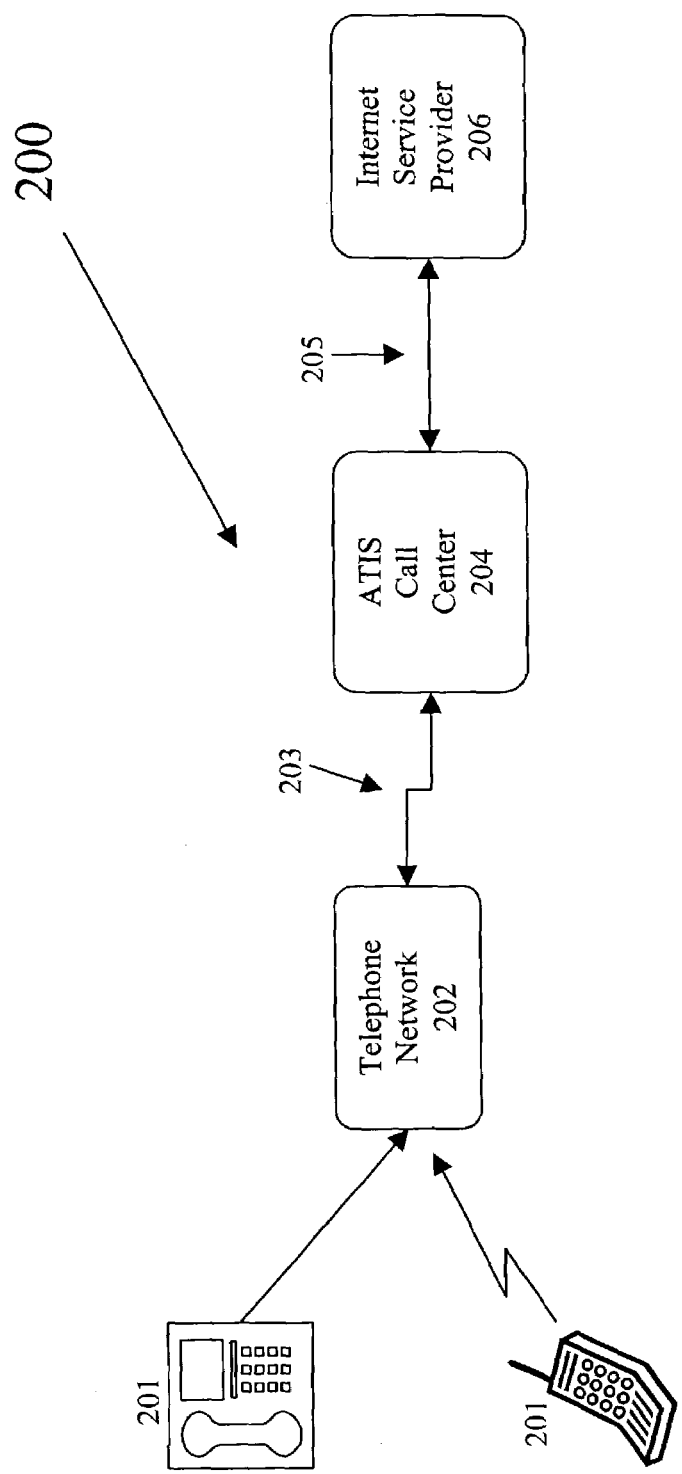
FIG. 2 is a simple block diagram of the application of the inventive information service call center.

FIG. 2 illustrates a simple block diagram 200 of the application of the inventive Alternative Telephone Information Service (ATIS) call center. A call to ATIS is originated with any variety of voice telephone 201 and routed through the telephone network 202 to the ATIS call center 204 using leased toll free "800" type numbers 203 made known to the caller. A direct leased line Internet connection 205, a T1, T3 (45 Mbps) or other known high speed service provider (ISP) 206 and the call center. This link is required for fast and reliable data management of large data files from a FTP server and to easily support other Internet services including e-mail and Web browsing. The entire call center or functional subparts thereof may be physically realized in a single location or geographically distributed as determined by business directives.

Figure 3:
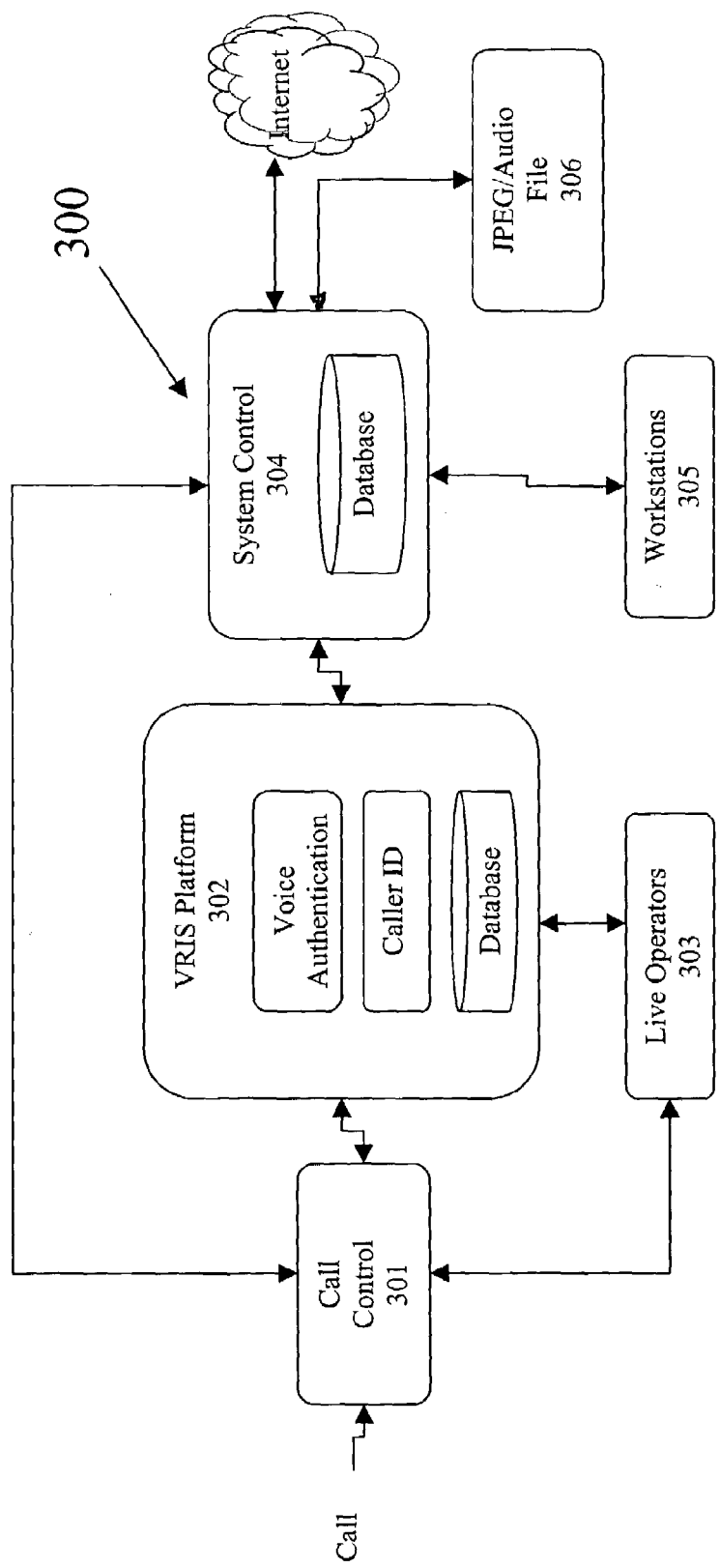
FIG. 3 is a block diagram of the inventive information service call center.

FIG. 3 depicts a block diagram of the inventive Alternative Telephone Information Service call center. Call control 301 routes and controls incoming calls to the voice recognition and interactive system 302 (VRIS) to affect voice prompt and caller voice response for account registration and routine requests from the information service. These two processes, caller registration and the request service information are covered in detail in the following discussion for FIGS. 4 and 5. It is preferred that all calls are to be entirely handled through the voice recognition and interactive system. If not, these indeterminate calls will be transferred to the next available live operator 303 to be handled in the well known fashion. The ability of VRIS will largely determine the number of calls that will require operator intervention.

The voice recognition and interactive system will be driven by a custom development of an application program based on the voice extensible markup language (VoiceXML). VoiceXML is a World Wide Web Consortium (W3C) standard markup language that allows for voice and DTMF interactions, caller ID capture and voiceprint authorization between the caller and the application, the information services of ATIS. The W3C have backed the development of this markup language in that it also includes the ability for Web-based development and content delivery to interactive voice response applications—Web browsing by telephone. VoiceXML applications accomplish this through synthesized text-to-speech and other functionality including recording audio messages, N-Best post-processing and recorded audio user prompting. Nuance Communications Inc. of Menlo Park, Calif. offers telephone speech solutions based on VoiceXML platform functions. They have implemented a number of successful speech applications including a "511" telephone service in the San Francisco Bay area that is "411" on all things travel. Travelers simply dial "511" and tell the system, such as "traffic conditions", what they want. Their requested information is then "spoken" back to them. The Nuance speech recognition application has eliminated confusing touch-tone menus, enabling people to quickly and easily get the information they want. It is this type of speech recognition capability that ATIS employs to handle calls entirely by voice prompt and caller voice response.

VRIS Platform 302 of FIG. 3 includes a database which is central to the operations of ATIS. This central database holds the service information for access by VRIS and the live operators. This, or another database, also stores caller ID and formatted promotional message scripts to be automatically inserted in the call for the caller to hear prior to delivery of the requested information service. This database is continually updated with service information gathered and processed by another processor as System Control 304. System Control is accessed through workstations 305 to facilitate ATIS personnel to monitor and adjust system operations as well as input or adjust promotional message script files and service information. This information may be gathered from Internet addressed data files and e-mail or input from in-hand sources, such as an audio tape or JPEG file 306 on floppy disc or by simple manual keyboard and the like input. It is preferable that ATIS maintain an editing facility to build, modify and format service information gathered from various sources and promotional messages submitted by the sponsor(s). This service information includes telephone listings, weather, date/time, local/national news, traffic conditions, airplane schedules, text to voice translated caller e-mail, account member mailbox messages or other information of interest to the local or national caller.

The promotional message scripts are digitally stored advertisement sound bites. These scripts are downloaded, formatted and placed on the central database and then translated and played by the voice recognition and interactive system in a similar fashion as handling the service information previously discussed. ATIS workstation operators also offer script editing services per sponsor agreements. It is expected that each caller will hear three advertisements of 66 seconds total duration prior to delivery of the requested service information. Promotional messages will be selected on a rotation basis with replay every fifty calls. The operational number, duration and frequency of advertisements played may be continuously adjusted as determined by ATIS.

Figure 4:
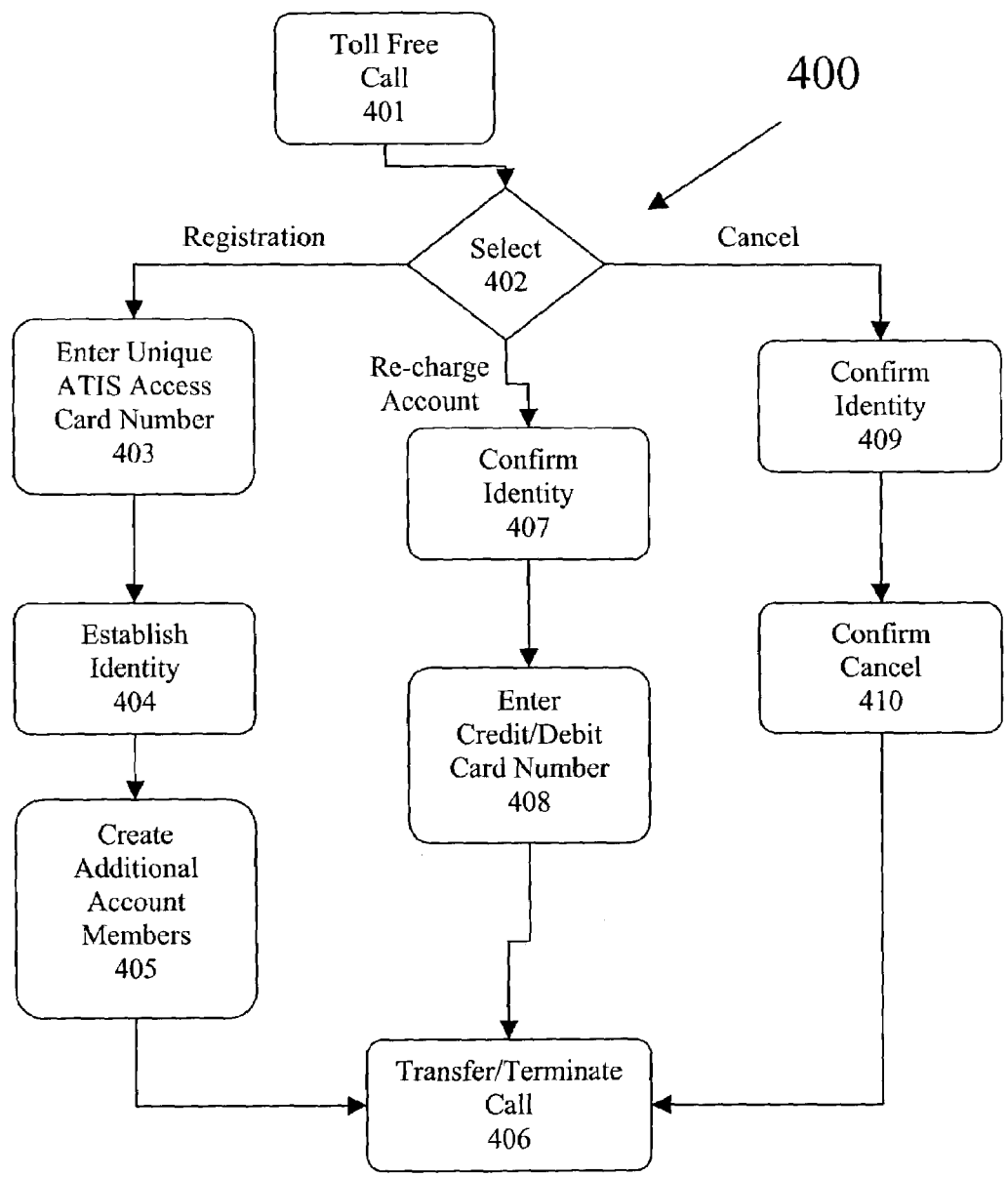
FIG. 4 is a flow chart of the steps by the caller to register, recharge, cancel or add members to an Alternative Telephone Information Service account.

The flow chart of FIG. 4 illustrates the system steps taken to register, recharge, cancel or add members to an Alternative Telephone Information Service account 400. In the first step, the caller dials a provided first identified toll free number 401. A first and second toll free number and a unique card number are distributed to the public on credit card size cards or the like through various methods, hereafter known as "Access Cards". The first number is intended to be used to register the caller with the telephone information service and the second number is identified as the number to use to utilize the information service. A single number may be specified to provide both services where the caller will be voice prompted to choose accordingly. After registration, the access card may be discarded without risk to the caller. The Access Card does not indicate a pin number (PIN) or a caller registered password that another must have to access the account. In the preferred registration method, the caller speaks a password or short phrase that is voice printed for recall by the service to authorize account activity.

An Access Card may indicate a monetary amount that the user will be charged for each call to the information service. There may be no monetary fee charged to the caller. If fees are charged, the Access Card will also indicate a deposit amount already credited to the account or the deposit amount required for deposit upon account registration. The deposit amount is typically $10 or $20 as determined by ATIS.

The Access Card may be purchased for the deposit amount in a similar fashion to pre-paid cards commonly sold by telephone carriers for long distance call services. The content and use of the ATIS Access Cards is the subject of a co-pending non-provisional application, Ser. No. 10/461,686 and is hereby incorporated by reference into this application.

In step 402 of FIG. 4, ATIS presents voice prompts to the caller to select registration, account recharge (if applicable) or to cancel an existing account. If the caller speaks "registration" or similar word or phrase, the system proceeds to prompt the caller to provide a unique registration number identified on the ATIS Access Card 403. Then, the caller is prompted to establish an account password 404 through identifying/confirming the calling telephone number as detected by ATIS or providing a four to eight number code input through the telephone DTMF touch pad. The preferred method of password is for ATIS to record or additionally provide a voice print of a word or short phrase selected and spoken by the caller. Word recognition or especially voice print passwords afford the best security and avoids troublesome telephone touch pad inputs. The caller is next prompted to choose whether or not to add up to five additional account members with identification of individual passwords as discussed above 405. At step 411, the caller is prompted to provide other personal information to support other information services including e-mail text to translation and voice mailbox for account members. Lastly, the caller is prompted for call transfer to information services or termination 406.

With return to the ATIS voice prompt at step 402 of FIG. 4, the caller may choose to recharge his ATIS access card with the spoken words "recharge card" or anything similar recognized by VRIS. This is followed by the voice prompts to confirm identity (password or calling telephone number) 407 and to provide a credit/debit card charge number 408 if monetary fees for the service will be charged. These simple account recharge steps are concluded with the caller to choose call transfer or termination 406.

The caller may choose to cancel his account as the third option at step 402 of FIG. 2. As before, the caller follows the voice prompts 409, 410 with the appropriate spoken word(s) or a simple telephone DTMF button press in a similar fashion as discussed for registration and account recharge.

Figure 5:
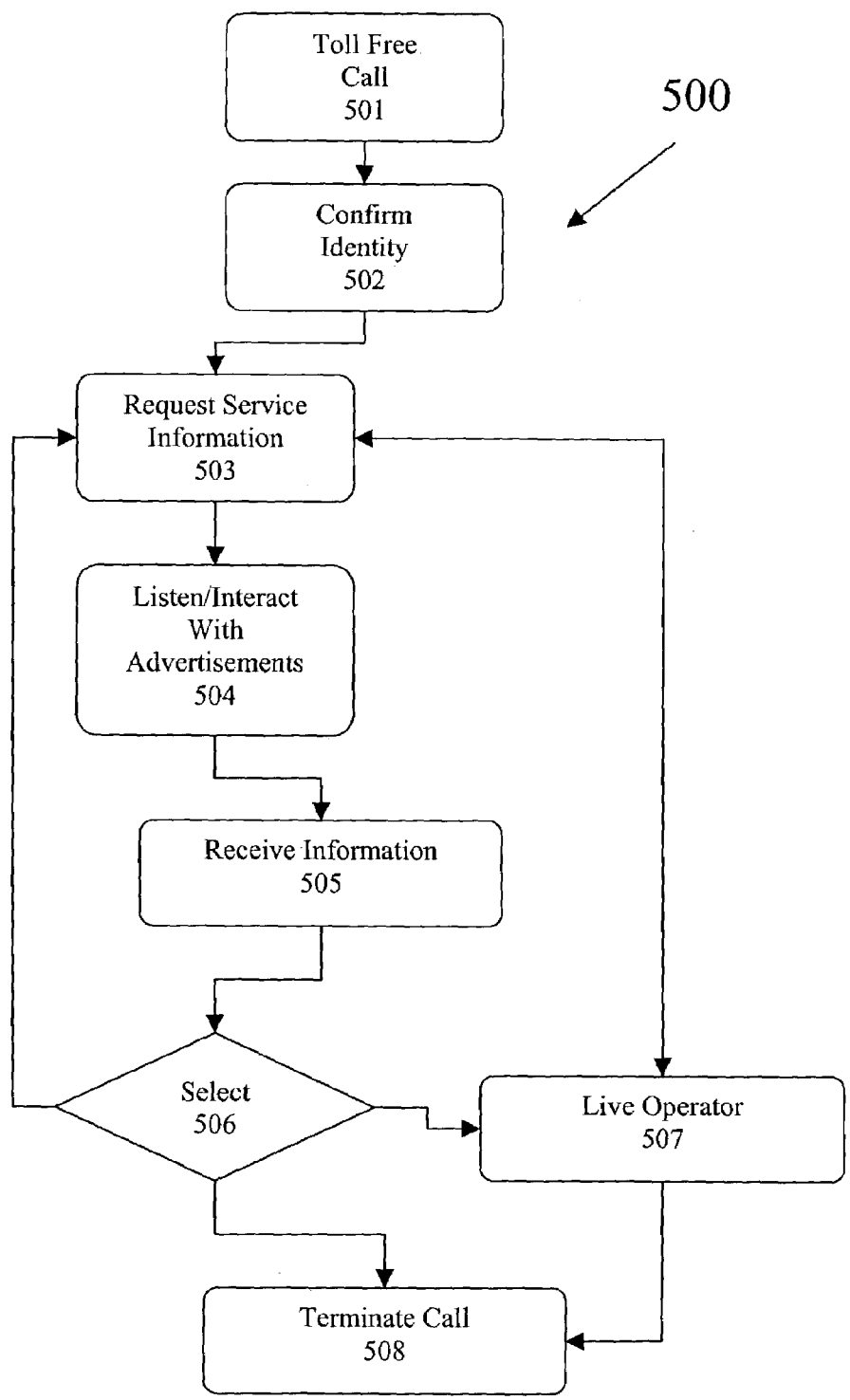
FIG. 5 is a flow chart of the steps for typical utilization of the information service call center.

FIG. 5 is a flow chart of the steps for caller utilization of the Alternative Telephone Information Service 500. At this point, the caller has successfully registered, preferably registered through a first toll free number, and has been transferred or has placed the information service call to a second provided toll free number 501. These numbers and conditions for their use with ATIS are identified on unique public distributed access cards previously discussed. The caller responds to voice prompts with a simple telephone push button press or, as preferred and described in the following, appropriate spoken word(s). At step 502, the caller confirms identity with his spoken password. Then, the caller is prompted to select the information service followed by other usual questions 503. For example, the caller responds with the spoken words "directory assistance" to be followed with a prompted city, state and name. If ATIS cannot reliably find or interpret the caller prompted responses, the system routes the call to a live operator and is terminated 508 if the operator cannot resolve the information request. With successful operator resolution, the call is routed to hear the promotional message(s) 504. The caller may be requested to interact during the period of the promotional message(s) where various participation rewards may be offered. These rewards include but are not limited to coupons, prizes, additional service information, shortened promotional message period or other promotional awards. ATIS provides the requested information at the conclusion of the promotional message(s) then logs the service event and debits the monetary amount, if a fee is required, in the unique caller account 505. Next, the caller is prompted to select 506 to make another service information request 503, request a live operator 507 or simply hang up to terminate the call 508. The live operator would be available to resolve problems or a misunderstanding with the requested information. For example, the caller may recognize that the returned information, i.e. a directory listing, is entirely incorrect.

The data structures and code described in this detailed description are typically stored on a computer readable storage medium, which may be any device or medium that can store code and/or data for use by a computer system. This includes, but is not limited to, an erasable programmable read only memory (EPROM), random access memory (RAM), magnetic and optical storage devices such as disk drives, magnetic tape, CDs (compact discs) and DVDs (digital video discs), and computer instruction signals embodied in a transmission medium (with or without a carrier wave upon which the signals are modulated). The system hardware equipment is comprised of current standard technology, including computers, networks, telecom switches, routes, hubs and various licensed ports.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A method of an alternative telephone information service to provide a telephone caller with caller requested information comprising:
   identifying a unique card number and a first voice telephone number and a second voice telephone number on one of many publicly distributed access cards where each access card exhibits a unique card number;
   placing a call using said first voice telephone number to the alternative telephone information service using a telephone service company other than the alternative telephone information service and said first voice telephone number, and
   registering and recording a unique caller account comprising said unique card number, a caller specified unique password and a monetary amount;
   placing a call using said second voice telephone number to the alternative telephone information service using a telephone service company other than the alternative telephone information service;
   authorizing use of registered unique caller account;
   requesting caller requested information of the alternative telephone information service;
   hearing predetermined promotional message content;
   receiving caller requested information;
   recording the occurrence of the caller event in the unique caller account; and
   terminating the call.

2. A method as claimed in claim 1 where said first voice telephone number is a toll free number and said second voice telephone number is a toll free number.

3. A method as claimed in claim 1 where said first voice telephone number and second voice telephone number is the same telephone number.

4. A method as claimed in claim 1 where said monetary amount comprises no amount of money.

5. A method as claimed in claim 1 where said monetary amount is paid by the caller.

6. A method as claimed in claim 1 where said monetary amount is identified on the card.

7. A method as claimed in claim 1 where said authorizing use of registered unique caller account comprises matching caller provided unique password to the password stored in said unique caller account.

8. A method as claimed in claim 7 where said unique password comprises a word or phrase spoken by the caner for voice recognition or voice print.

9. A method as claimed in claim 7 where said password comprises the caller origination telephone number.

10. A method as claimed in claim 7 where said password comprises telephone touch pad DTMF sequence and limited quantity by the caller.

11. A method as claimed in claim 1 where said recording further comprises debiting said unique caller account for a monetary amount identified to the caller by the telephone information service for each completed call.

12. A method as claimed in claim 1 where the alternative telephone information service is accessed through a Public Switched Telephone Network and wireless voice telephone systems.

* * * * *